US006534180B2

(12) United States Patent
Hoshi

(10) Patent No.: US 6,534,180 B2
(45) Date of Patent: Mar. 18, 2003

(54) CHARGE-IMPARTING MEMBER

(75) Inventor: Junya Hoshi, Kanagawa (JP)

(73) Assignee: Hokushin Corporation, Kanagawa (JP)

(*) Notice: Subject to any disclaimer, the term of this patent is extended or adjusted under 35 U.S.C. 154(b) by 0 days.

(21) Appl. No.: 09/855,571

(22) Filed: May 16, 2001

(65) Prior Publication Data

US 2001/0055687 A1 Dec. 27, 2001

(30) Foreign Application Priority Data

May 16, 2000 (JP) ....................................... 2000-142769

(51) Int. Cl.[7] ......................... B32B 25/14; B32B 25/20; G03G 15/02

(52) U.S. Cl. ....................... 428/413; 428/421; 428/447; 428/522; 428/906; 399/168; 492/56

(58) Field of Search ................................ 399/168, 176; 428/36.8, 36.91, 413, 421, 422, 447, 522, 906; 492/56

(56) References Cited

FOREIGN PATENT DOCUMENTS

| | | |
|---|---|---|
| EP | 0 606 907 | 7/1994 |
| EP | 0 629 928 | 12/1994 |
| EP | 0 810 486 | 12/1997 |
| EP | 0 867 782 | 9/1998 |
| EP | 0 982 335 | 3/2000 |
| JP | 5-173409 | 7/1993 |
| JP | 5-204234 | 8/1993 |
| JP | 6-159349 | 6/1994 |
| JP | 7-134467 | 5/1995 |
| JP | 8-160701 | 6/1996 |
| JP | 10-196638 | 7/1998 |
| JP | 10-251426 | 9/1998 |

OTHER PUBLICATIONS

European Search Report for EP 01 11 1577 dated Aug. 30, 2001.

*Primary Examiner*—Paul Thibodeau
*Assistant Examiner*—Ramsey Zacharia
(74) *Attorney, Agent, or Firm*—Sughrue Mion, PLLC

(57) ABSTRACT

An object of the invention is to provide a charge-imparting member which can be produced at low cost and maintains superior characteristics for a long period of time. The invention provides a charge-imparting member including an elastic layer formed of an epichlorohydrin rubber material and a surface-treated layer formed by use of a surface treatment liquid containing at least one polymer selected from among an acrylic fluoropolymer and an acrylic silicone polymer; a conductivity-imparting agent; and an isocyanate component.

7 Claims, 2 Drawing Sheets

CHARGE-IMPARTING MEMBER

BACKGROUND OF THE INVENTION

1. Field of the Invention

The present invention relates to a charge-imparting member which is used for imparting an electric charge uniformly to an object such as a photoreceptor of an image-forming apparatus such as an electrophotographic copying machine or printer, or a toner-jet copying machine or printer.

2. Background Art

In image-forming apparatuses such as electrophotographic copying machines and printers and toner-jet copying machines and printers, members such as a charge-imparting roll, a development roll, a toner controller, an intermediate transfer roll, and a belt must be endowed with properties such as a non-staining property to a photoreceptor or a similar member, and conductivity and friction coefficient of certain levels. Accordingly, such members formed of a material such as polyurethane or silicone rubber have conventionally been used. However, such polymer-made members are replaced with those provided on an elastic layer in combination with a coating layer or a coating tube, in view of an anti-staining property to a photoreceptor or a similar member; chargeability; and for other reasons.

Specifically, Japanese Patent Application Laid-Open (kokai) No. 5-204234 discloses a development roller provided on a conductive sponge layer having a conductive outermost layer formed of a polyamide resin tube. Japanese Patent Application Laid-Open (kokai) No. 7-134467 discloses a charge-imparting member having a surface layer containing a lubricant such as wax. Japanese Patent Application Laid-Open (kokai) No. 8-160701 discloses a charge-imparting member having a coating layer formed of a fluorocarbon-containing conductive polymer or having a surface layer formed of a seamless tube.

However, a surface layer provided through a method such as a direct application method does not necessarily attain satisfactory adhesion to a substrate and so may have poor durability. Thus, such a surface layer disadvantageously poses a problem of poor long-term reliability. Similarly, a surface layer formed of a seamless tube exhibits lower processability and is produced at high cost. In addition, since the surface layer is isolated with an elastic layer, problems such as insufficient charging characteristics arise.

In order to solve the above-described problems, the present inventors previously developed a development roller provided with a surface-treated layer which had been produced by treating the surface of the roller with an isocyanate compound (Japanese Patent Application Laid-Open (kokai) No. 5-173409), in an attempt to produce a charge-imparting member which can be formed easily and exhibits excellent durability by virtue of a monolithic structure with an elastic layer. However, the development roll provided with an isocyanate-treated layer requires high rotation torque and possibly poses drawbacks such as jitter, filming, and toner conveyance.

SUMMARY OF THE INVENTION

In view of the foregoing, the present inventors have carried out extensive studies so as to solve the aforementioned problems. Thus, an object of the present invention is to provide a charge-imparting member which can be produced at low cost and can maintain favorable characteristics for a long period of time.

Accordingly, in one aspect of the invention, there is provided a charge-imparting member comprising an elastic layer formed of an epichlorohydrin rubber material and a surface-treated layer formed by use of a surface treatment liquid containing at least one polymer selected from among an acrylic fluoropolymer and an acrylic silicone polymer; a conductivity-imparting agent; and an isocyanate component.

The elastic layer may be formed of a material containing at least one species selected from the group consisting of epichlorohydrin rubber, an epichlorohydrin-ethylene oxide copolymer, and an epichlorohydrin-ethylene oxide-allyl glycidyl ether copolymer.

The elastic layer may have a rubber hardness of 30° to 70° as specified in JIS A.

The conductivity-imparting agent may comprise at least one electron-conductive conductivity-imparting agent selected from the group consisting of a metal oxide micropowder and carbon black.

The conductivity-imparting agent may comprise an ion-conductive conductivity-imparting agent and at least one electron-conductive conductivity-imparting agent selected from the group consisting of a metal oxide micropowder and carbon black.

The surface treatment liquid may contain the conductivity-imparting agent in an amount of 10–40 wt. % based on the isocyanate component.

The surface treatment liquid may contain at least one polymer in a total amount of 2–30 wt. % based on the isocyanate component.

The surface-treated layer may be formed by impregnating the surface of the epichlorohydrin rubber material with the surface treatment liquid and heating.

According to the present invention, the surface-treated layer is monolithically provided in the surface of the charge-imparting member, and uniformly contains carbon black and the acrylic fluoropolymer or the acrylic silicone polymer. Since the thus-formed surface-treated layer is prepared by impregnating the surface of the rubber member with a surface treatment liquid, the density of the formed surface layer gradually decreases from the surface to the inside. Thus, the present invention can provide a charge-imparting member which is not contaminated during contact with an organic photoreceptor, exhibits small environment-dependent variance in electrical characteristics, and has an excellent anti-toner-filming property.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with accompanying drawings, in which.

DETAILED DESCRIPTION OF PREFERRED EMBODIMENTS

Figure 1A:
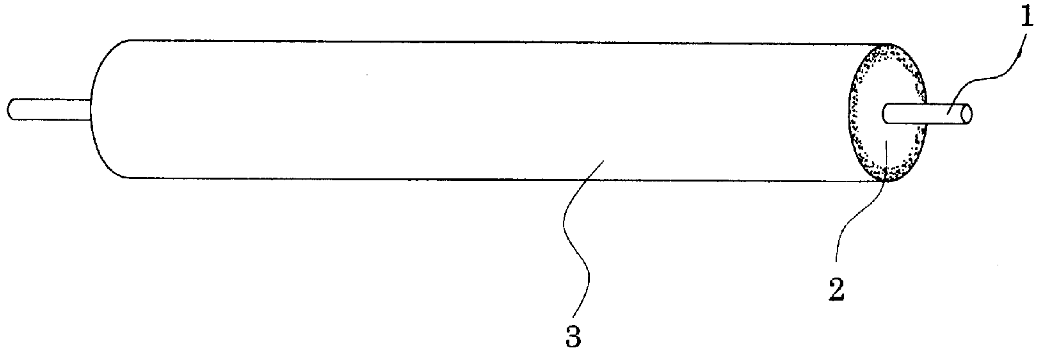
FIG. 1A is a perspective view of a charge-imparting roller according to one embodiment of the present invention.

The surface treatment liquid used in the present invention contains an isocyanate compound; an acrylic fluoropolymer or an acrylic silicone polymer; and a conductivity-imparting agent.

Examples of the isocyanate compound include 2,6-tolylene diisocyanate (TDI), 4,4'-diphenylmethane diisocyanate (MDI), p-phenylene diisocyanate (PPDI), 1,5-naphthalene diisocyanate (NDI), and 3,3-dimethyldiphenyl-4,4'-diisocyanate (TODI).

The acrylic fluoropolymer and the acrylic silicone polymer can be dissolved in a specific solvent and react with an isocyanate compound, to thereby chemically link to the isocyanate compound.

The acrylic fluoropolymer can be dissolved in a solvent and has a functional group such as a hydroxyl group, an alkyl group, or a carboxyl group. Specific examples include acrylate ester-fluoroalkyl acrylate block copolymers and derivatives thereof.

The acrylic silicone polymer can be dissolved in a solvent, and specific examples include acrylate ester-siloxane acrylate block copolymers and derivatives thereof.

In the present invention, these polymers are used singly or in combination of two or more species. Such polymers are preferably contained in the surface treatment liquid in a total amount of 2–30 wt. % based on the isocyanate component. When the amount is small, the effect of retaining carbon black in the surface-treated layer becomes poor, whereas when the amount is excessive, the relative amount of isocyanate component decreases, to thereby fail to form an effective surface-treated layer.

In the present invention, at least one electron-conductive conductivity-imparting agent is employed as the conductivity-imparting agent incorporated in the surface-treated layer. The electron-conductive conductivity-imparting agent is selected from the group consisting of conductive carbon such as carbon black and micropowder of an oxide of a metal such as tin, zinc, or antimony. In addition to such a conductivity-imparting agent, an ion-conductive conductivity-imparting agent may be added. Examples of the ion-conductive conductivity-imparting agent include ammine complexes of a metal such as Li, Na, K, Ca, and Mg, and perchlorate, bromate, iodate, carboxylate, sulfonate, sulfate, and acetate salts of such a metal. Of these, salts such as lithium perchlorate are preferably used.

Particularly, use of carbon black is preferred as the conductivity-imparting agent of the present invention. No particular limitation is imposed on the type of carbon black, and specific examples include Ketjen Black (product of Lion Corporation) and Toka Black #5500 (product of Tokai Carbon Co., Ltd.).

The surface treatment liquid contains a conductivity-imparting agent such as carbon black preferably in an amount of 10–40 wt. % based on the isocyanate component. When the amount is less than 10 wt. %, effective charging characteristics cannot be attained, whereas when the amount is in excess of 40 wt. %, problematic release of the agent occurs. Both cases are disadvantageous.

The surface treatment liquid contains a solvent which dissolves the isocyanate compound and the aforementioned acrylic fluoropolymer and acrylic silicone polymer. The solvent is not particularly limited, and an organic solvent such as ethyl acetate, methyl ethyl ketone (MEK), or toluene may be used.

The elastic layer of the charge-imparting member is formed of a material predominantly containing epichlorohydrin rubber material such as epichlorohydrin rubber, an epichlorohydrin-ethylene oxide copolymer, and an epichlorohydrin-ethylene oxide-allyl glycidyl ether copolymer. The epichlorohydrin rubber to be used in the present invention preferably has a rubber hardness of 30° to 70° as specified in JIS A.

The elastic layer of the present invention may incorporate a conductivity-imparting agent. The aforementioned electron-conductive conductivity-imparting agent and the ion-conductive conductivity-imparting agent may be used singly or in combination.

The elastic layer to which conductivity is imparted by the agent in the above manner preferably has a conductivity of approximately $1\times10^5$ to $1\times10^{10}$ Ω·cm.

Finally, the surface of the rubber member is impregnated with the aforementioned surface treatment liquid, to thereby form a surface-treated layer. Thus, a charge-imparting member which can maintain favorable characteristics for a long period of time can be produced at low cost.

EXAMPLES

The present invention will next be described by way of examples.

Figure 1B:
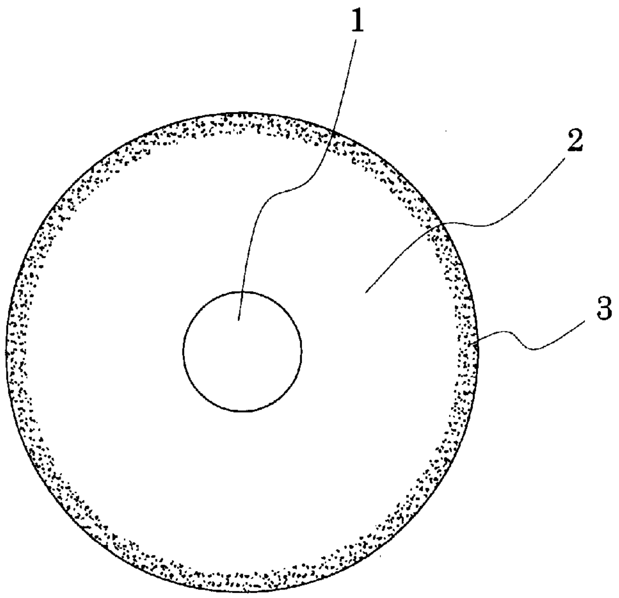
FIG. 1B is a cross-sectional view of a charge-imparting roller according to the embodiment of the present invention.

FIG. 1A is a perspective view and FIG. 1B is a cross-sectional view of a charge-imparting roller according to one example of the present invention. As shown in FIGS. 1A and 1B, a conductive elastic layer 2 formed of an epichlorohydrin rubber material is provided around a metallic core 1, and a surface-treated layer 3 is monolithically formed on the conductive elastic layer 2.

Figure 2:
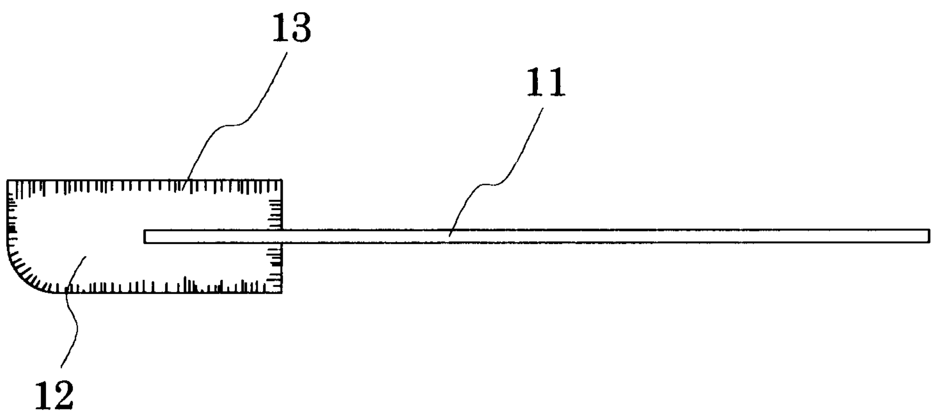
FIG. 2 is a cross-sectional view of a charge-imparting blade according to another embodiment of the present invention.

FIG. 2 is a cross-sectional view of a charge-imparting blade according to another example of the present invention. As shown in FIG. 2, a conductive elastic layer 12 is provided on a holder 11, and a surface-treated layer 13 is monolithically formed on the conductive elastic layer 12.

Examples of producing a charge-imparting member will next be described, taking a charge-imparting roller as an example of the member. Unless otherwise specified, the unit “parts” represents “parts by weight.”

Example 1

(Production of a Roller)

Epichlorohydrin rubber (Epichlomer CG-102, product of Daiso) (100 parts), sodium trifluoroacetate (0.3 parts) serving as a conductive material, zinc oxide (ZnO) (5 parts), and 2-mercaptoimidazoline (Accel-22) (2 parts) serving as a vulcanizer were kneaded by means of a roll mixer, and the kneaded product was press-formed on the surface of a metallic shaft (diameter 6 mm). The thus-coated shaft was polished, to thereby adjust the diameter to 12 mm, producing a roller in which a rubber elastic member is formed on the surface of the shaft.

(Preparation of Surface Treatment Liquid)

Ethyl acetate (100 parts), an isocyanate compound (MD1; product of Dainippon Ink and Chemicals, Inc.) (20 parts), acetylene black (product of Denki Kagaku Kogyo K.K.) (4 parts), and an acrylic silicone polymer (Modiper FS 700, product of Nippon Oil & Fats Co., Ltd.) (2 parts) were mixed, so as to disperse the components, for three hours by means of a ball mill, to thereby obtain a liquid.

(Surface Treatment of a Roller)

The thus-produced roller was immersed for 10 seconds in the thus-prepared liquid maintained at 23° C., and subsequently heated for one hour in an oven maintained at 120° C., to thereby obtain a charge-imparting roller.

Example 2

(Production of a Roller)

The procedure of Example 1 (Production of a roller) was repeated, to thereby produce a roller.

(Preparation of Surface Treatment Liquid)

Ethyl acetate (100 parts), an isocyanate compound (MD1; product of Dainippon Ink and Chemicals, Inc.) (20 parts), acetylene black (product of Denki Kagaku Kogyo K.K.) (4 parts), and an acrylic fluoropolymer (Novafusso, product of Dai Nippon Shikizai Kogyo Co., Ltd.) (2 parts) were mixed, so as to disperse the components, for three hours by means of a ball mill to thereby obtain a liquid.

(Surface Treatment of a Roller)

The thus-produced roller was immersed for 10 seconds in the thus-prepared liquid maintained at 23° C., and subsequently heated for one hour in an oven maintained at 120° C., to thereby obtain a charge-imparting roller.

Comparative Example 1

(Production of a Roller)

The procedure of Example 1 (Production of a roller) was repeated, to thereby produce a roller.

(Preparation of Surface Treatment Liquid)

An isocyanate compound (MD1; product of Dainippon Ink and Chemicals, Inc.) was dissolved in ethyl acetate, to thereby prepare a 10 wt. % solution thereof in ethyl acetate.

(Surface Treatment of a Roller)

The thus-produced roller was immersed for 10 seconds in the thus-prepared solution maintained at 23° C., and subsequently heated for one hour in an oven maintained at 120° C., to thereby obtain a charge-imparting roller.

Comparative Example 2

(Production of a Roller)

The procedure of Example 1 (Production of a roller) was repeated, to thereby produce a roller.

(Preparation of Surface Treatment Liquid)

Ethyl acetate (100 parts), an isocyanate compound (MD1; product of Dainippon Ink and Chemicals, Inc.) (20 parts), and an acrylic fluoropolymer (Novafusso, product of Dai Nippon Shikizai Kogyo Co., Ltd.) (2 parts) were mixed, so as to disperse the components, for three hours by means of a ball mill to thereby obtain a liquid.

(Surface Treatment of a Roller)

The thus-produced roller was immersed for 10 seconds in the thus-prepared liquid maintained at 23° C., and subsequently heated for one hour in an oven maintained at 120° C., to thereby obtain a charge-imparting roller.

Comparative Example 3

(Production of a Roller)

The procedure of Example 1 (Production of a roller) was repeated, to thereby produce a roller.

(Preparation of Surface Treatment Liquid)

Ethyl acetate (100 parts), an isocyanate compound (MD1; product of Dainippon Ink and Chemicals, Inc.) (20 parts), and acetylene black (product of Denki Kagaku Kogyo K.K.) (4 parts) were mixed, so as to disperse the components, for three hours by means of a ball mill to thereby obtain a liquid.

(Surface Treatment of a Roller)

The thus-produced roller was immersed for 10 seconds in the thus-prepared liquid maintained at 23° C., and subsequently heated for one hour in an oven maintained at 120° C., to thereby obtain a charge-imparting roller.

Test Example 1

Electrical Resistance

Figure 3:
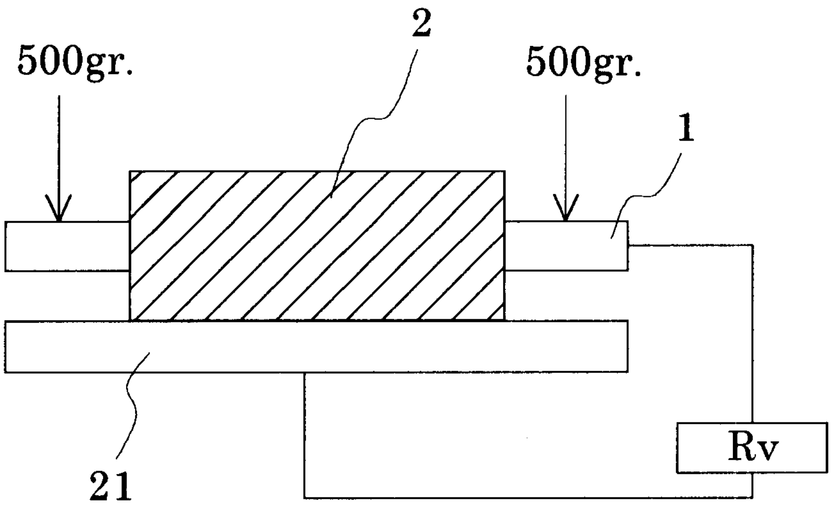
FIG. 3 is a chart showing a method for measuring resistance of the charge-imparting roller.

Each of the charge-imparting rollers produced in the above-described Examples and Comparative Examples was subjected to measurement of electrical resistance, while the roller was allowed to stand under the conditions of 10° C. and 30% RH (LL); 25° C. and 55% RH (NN); and 40° C. and 80% RH (HH). The electrical resistance of the charge-imparting roller was measured in a manner as shown in FIG. 3. Specifically, the charge-imparting roller was placed on an electrode member 21 formed of an SUS 304 plate, and a load of 500 g was applied to each end of a metallic core 1. In this state, electrical resistance between the metallic core 1 and the electrode member 21 was measured by means of ULTRA HIGH RESISTANCE METER R8340A (product of Advan Test). The applied voltage during measurement was 500V. The results are shown in Tables 1-1 and 1-2.

Test Example 2

Evaluation of Printed Image

Each of the charge-imparting rollers produced in the above-described Examples and Comparative Examples was built into a charge-imparting part of a commercial laser-beam printer. An image was output by operating the printer under the conditions of LL and HH specified in Test Example 1. The results are also shown in Table 1-2.

Test Example 3

Continuous Printing

Each of the charge-imparting rollers produced in the above-described Examples and Comparative Examples was built into a commercial laser-beam printer. After 10,000 continuous printing operations were completed, the surface of the roller was observed under a microscope, and printed images were evaluated. The results are also shown in Table 1-2.

Test Example 4

Damage to Roller Surface

Each of the charge-imparting rollers produced in the above-described Examples and Comparative Examples was built into a toner cartridge to be incorporated into a commercial laser-beam printer. The cartridge was allowed to stand for 14 days under the conditions of 50° C. and 90% RH. Thereafter, the charge-imparting roller-including cartridge was incorporated into the printer, to thereby output an image. The surface of the roller was observed under a microscope, output images were evaluated. The results are also shown in Table 1-2.

TABLE 1-1

| | | Ex. 1 | Ex. 2 | Comp. Ex. 1 | Comp. Ex. 2 | Comp. Ex. 3 |
|---|---|---|---|---|---|---|
| Material | | ECH[1) ] rubber | ECH[1)] rubber | ECH[1)] rubber | ECH[1)] rubber | ECH[1)] rubber |
| Ion-conductive material | | $CF_3COONa$ | $CF_3COONa$ | $CF_3COONa$ | $CF_3COONa$ | $CF_3COONa$ |
| Surface treatment | | Isocyanate<br>C black<br>AS[2)] polymer | Isocyanate<br>C black<br>AF[3)] polymer | Isocyanate<br>—<br>— | Isocyanate<br>—<br>AF[3)] polymer | Isocyanate<br>C black<br>— |
| Electrical | LL | $1.0 \times 10^6$ | $2.5 \times 10^6$ | $6.9 \times 10^6$ | $1.0 \times 10^7$ | $5.0 \times 10^5$ |
| Resistance | NN | $3.0 \times 10^5$ | $7.0 \times 10^5$ | $5.2 \times 10^5$ | $1.5 \times 10^6$ | $3.0 \times 10^5$ |
| Test Ex. 1 | HH | $1.5 \times 10^5$ | $1.5 \times 10^5$ | $9.7 \times 10^4$ | $2.0 \times 10^5$ | $9.0 \times 10^4$ |

[1)]ECH: Epichlorohydrin

[2)]AS: Acrylic silicone,

[3)]AF: Acrylic fluoro

TABLE 1-2

| | | Ex. 1 | Ex. 2 | Comp. Ex. 1 | Comp. Ex. 2 | Comp. Ex. 3 |
|---|---|---|---|---|---|---|
| Material | | ECH[1) ]rubber | ECH[1)] rubber | ECH[1)] rubber | ECH[1)] rubber | ECH[1)] rubber |
| Ion-conductive material | | $CF_3COONa$ | $CF_3COONa$ | $CF_3COONa$ | $CF_3COONa$ | $CF_3COONa$ |
| Surface treatment | | Isocyanate | Isocyanate | Isocyanate | Isocyanate | Isocyanate |
| | | C black | C black | — | — | C black |
| | | AS[2)] polymer | AF[3)] polymer | — | AF[3)] polymer | — |
| Image | LL | 0 | 0 | 0 | X | 0 |
| Test Ex. 2 | HH | 0 | 0 | 0 | 0 | X |
| Continuous printing | Roller surface | 0 | 0 | X | 0 | X |
| Test Ex. 3 | Image | 0 | 0 | X | 0 | Δ |
| 50° C. × 90% | Roller surface | 0 | 0 | X | 0 | X |
| Test Ex. 4 | | | | | | |
| | Image | 0 | 0 | X | 0 | Δ |

[1)]ECH: Epichlorohydrin
[2)]AS: Acrylic silicone,
[3)]AF: Acrylic fluoro

As is clear from Table 1-1, regarding Test Example 1, the charge-imparting rollers of Examples 1 and 2 exhibit a favorably small environment-dependency in electrical resistance (LL-HH), whereas the charge-imparting rollers of Comparative Examples 1 to 3 exhibit a large environment-dependency in electrical resistance.

Regarding Test Example 2, the charge-imparting rollers of Examples 1 and 2 and Comparative Example 1 provide a favorable environment-dependency (LL-HH); i.e., no image unevenness and deterioration, whereas the charge-imparting rollers of Comparative Examples 2 and 3 provide image unevenness and deterioration.

Regarding Test Example 3, the charge-imparting rollers of Examples 1 and 2 and Comparative Example 2 exhibit a low level of filming on the surface of the roller and provide no image deterioration, whereas the charge-imparting rollers of Comparative Examples 1 and 3 exhibit white filming on the surface and provide image unevenness.

Regarding Test Example 4, the charge-imparting rollers of Examples 1 and 2 and Comparative Example 2 exhibit no change in image quality and roller surface conditions before and after the test, whereas the charge-imparting rollers of Comparative Examples 1 and 3 exhibit bleed on the roller surface and provide image deterioration.

These tests reveal that the charge-imparting rollers of Examples 1 and 2 exhibit excellent roller characteristics.

In addition, the charge-imparting rollers of Examples 1 and 2 can be produced at low cost, since a conductive elastic layer can be formed in the surface of each roller by simply impregnating the roller with a surface treatment liquid, to thereby impart superior roller characteristics to the roller.

As described hereinabove, the charge-imparting member of the present invention can be produced in a simple manner and is endowed with enhanced durability. Thus, production cost thereof can be reduced. In addition, a development roll employing the charge-imparting member can be endowed with enhanced roller characteristics.

What is claimed is:

1. A charge-imparting member comprising an elastic layer formed of an epichlorohydrin rubber material and a surface-treated layer formed by use of a surface treatment liquid containing at least one polymer selected from among an acrylic fluoropolymer and an acrylic silicone polymer; a conductivity-imparting agent; and an isocyanate component, wherein the surface treatment liquid contains said at least one polymer in a total amount of 2–30 wt. % based on the isocyanate component.

2. A charge-imparting member according to claim 1, wherein the elastic layer is formed of a material containing at least one species selected from the group consisting of epichlorohydrin rubber, an epichlorohydrin-ethylene oxide copolymer, and an epichlorohydrin-ethylene oxide-allyl glycidyl ether copolymer.

3. A charge-imparting member according to claim 1, wherein the elastic layer has a rubber hardness of 30° to 70° as specified in JIS A.

4. A charge-imparting member according to claim 1, wherein the conductivity-imparting agent comprises carbon black.

5. A charge-imparting member according to claim 1, wherein the conductivity-imparting agent comprises an ion-conductive conductivity-imparting agent and carbon black.

6. A charge-imparting member according to claim 1, wherein the surface treatment liquid contains the conductivity-imparting agent in an amount of 10–40 wt. % based on the isocyanate component.

7. A charge-imparting member according to claim 1, wherein the surface-treated layer is formed by impregnating the surface of the epichlorohydrin rubber material with the surface treatment liquid and heating.

* * * * *